United States Patent
Hong et al.

(10) Patent No.: US 10,667,322 B2
(45) Date of Patent: May 26, 2020

(54) METHOD AND APPARATUS FOR CHANGING CONNECTION STATE OF TERMINAL

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/098,841

(22) PCT Filed: Apr. 26, 2017

(86) PCT No.: PCT/KR2017/004432
§ 371 (c)(1),
(2) Date: Nov. 2, 2018

(87) PCT Pub. No.: WO2017/191926
PCT Pub. Date: Nov. 9, 2017

(65) Prior Publication Data
US 2019/0132900 A1 May 2, 2019

(30) Foreign Application Priority Data

May 3, 2016 (KR) .................. 10-2016-0054936
May 3, 2016 (KR) .................. 10-2016-0054937
Apr. 26, 2017 (KR) .................. 10-2017-0053295

(51) Int. Cl.
*H04W 76/27* (2018.01)
*H04W 76/11* (2018.01)
(Continued)

(52) U.S. Cl.
CPC ............. *H04W 76/27* (2018.02); *H04W 8/08* (2013.01); *H04W 12/00512* (2019.01);
(Continued)

(58) Field of Classification Search
CPC ..... H04W 76/27; H04W 76/11; H04W 68/02; H04W 76/28; H04W 76/30; H04W 8/08;
(Continued)

(56) References Cited

U.S. PATENT DOCUMENTS

2011/0244823 A1 10/2011 Chen
2013/0242720 A1 9/2013 Chou
(Continued)

FOREIGN PATENT DOCUMENTS

KR 10-2014-0136470 A 11/2014
KR 10-2016-0002327 A 1/2016

OTHER PUBLICATIONS

Huawei et al., "Motivation for new WI on Light Connection in LTE", RP-160301, 3GPP TSG RAN Meeting #71, Goteborg, Sweden, Mar. 7-11, 2016, pp. 1-14.
(Continued)

*Primary Examiner* — Dady Chery
(74) *Attorney, Agent, or Firm* — IP Legal Services, LLC

(57) ABSTRACT

Provided are a method and apparatus for changing a connection state by user equipment in a light connection state using a paging message. The method of changing a connection state by user equipment may include receiving, from a base station, an radio resource control (RRC) message including instruction information for instructing state transition into a light connection state, configuring the connection state of the user equipment in the light connection state based on the instruction information, receiving a paging message for the user equipment, and determining to change the connection state of the user equipment based on a user equipment identifier included in the paging message.

16 Claims, 6 Drawing Sheets

(51) Int. Cl.
*H04W 68/02* (2009.01)
*H04W 76/28* (2018.01)
*H04W 76/30* (2018.01)
*H04W 8/08* (2009.01)
*H04W 12/00* (2009.01)
*H04W 28/02* (2009.01)
*H04W 12/06* (2009.01)
*H04W 88/02* (2009.01)

(52) U.S. Cl.
CPC ....... *H04W 28/0215* (2013.01); *H04W 68/02* (2013.01); *H04W 76/11* (2018.02); *H04W 76/28* (2018.02); *H04W 76/30* (2018.02); *H04W 12/06* (2013.01); *H04W 88/02* (2013.01)

(58) Field of Classification Search
CPC ....... H04W 12/00512; H04W 28/0215; H04W 12/06; H04W 88/02; H04W 68/00; H04W 8/26; H04W 8/18; H04W 8/24
See application file for complete search history.

(56) References Cited

U.S. PATENT DOCUMENTS

| | | | |
|---|---|---|---|
| 2013/0242726 A1 | 9/2013 | Zhu et al. |
| 2013/0242735 A1 | 9/2013 | Koc et al. |
| 2013/0242770 A1 | 9/2013 | Chen et al. |
| 2013/0242812 A1 | 9/2013 | Khoryaev et al. |
| 2013/0242816 A1 | 9/2013 | He et al. |
| 2013/0242817 A1 | 9/2013 | He et al. |
| 2013/0242818 A1 | 9/2013 | Heo et al. |
| 2013/0242819 A1 | 9/2013 | He et al. |
| 2013/0242832 A1 | 9/2013 | Koc et al. |
| 2013/0242885 A1 | 9/2013 | Zhu et al. |
| 2013/0242886 A1 | 9/2013 | Chen et al. |
| 2013/0242889 A1 | 9/2013 | Khoryaev et al. |
| 2013/0242890 A1 | 9/2013 | He et al. |
| 2013/0242947 A1 | 9/2013 | Chen et al. |
| 2013/0244656 A1 | 9/2013 | Heo et al. |
| 2013/0244709 A1 | 9/2013 | Davydov et al. |
| 2013/0247118 A1 | 9/2013 | Oyman |
| 2013/0265928 A1 | 10/2013 | Martinez et al. |
| 2013/0272132 A1 | 10/2013 | Heo et al. |
| 2013/0272148 A1 | 10/2013 | Fong et al. |
| 2013/0272170 A1 | 10/2013 | Chatterjee et al. |
| 2013/0272181 A1 | 10/2013 | Fong et al. |
| 2013/0272182 A1 | 10/2013 | Li et al. |
| 2013/0272196 A1 | 10/2013 | Li et al. |
| 2013/0272214 A1 | 10/2013 | Zhu et al. |
| 2013/0272215 A1 | 10/2013 | Khoryaev et al. |
| 2013/0272262 A1 | 10/2013 | Li et al. |
| 2013/0273878 A1 | 10/2013 | Heo et al. |
| 2013/0273923 A1 | 10/2013 | Li et al. |
| 2013/0301420 A1 | 11/2013 | Zhang et al. |
| 2013/0301435 A1 | 11/2013 | Panah et al. |
| 2013/0301438 A1 | 11/2013 | Li et al. |
| 2013/0301439 A1 | 11/2013 | Heo et al. |
| 2013/0301489 A1 | 11/2013 | Sirotkin et al. |
| 2013/0301490 A1 | 11/2013 | He et al. |
| 2013/0301499 A1* | 11/2013 | Jain ......................... H04W 4/70 370/311 |
| 2013/0301500 A1 | 11/2013 | Koc et al. |
| 2013/0301547 A1 | 11/2013 | Gupta et al. |
| 2013/0301548 A1 | 11/2013 | Etemad et al. |
| 2013/0301549 A1 | 11/2013 | Chen et al. |
| 2013/0303104 A1 | 11/2013 | Venkatachalam et al. |
| 2013/0303160 A1 | 11/2013 | Fong et al. |
| 2013/0303166 A1 | 11/2013 | Jain et al. |
| 2013/0303167 A1 | 11/2013 | Zhu et al. |
| 2013/0303231 A1 | 11/2013 | Yiu et al. |
| 2014/0003320 A1 | 1/2014 | Etemad et al. |
| 2014/0044076 A1 | 2/2014 | Etemad et al. |
| 2014/0140278 A1 | 5/2014 | Chou |
| 2014/0254504 A1 | 9/2014 | Bashar et al. |
| 2014/0307596 A1 | 10/2014 | He et al. |
| 2014/0376440 A1 | 12/2014 | Oyman |
| 2015/0009816 A1* | 1/2015 | Hsu ......................... H04L 47/24 370/230.1 |
| 2015/0036569 A1 | 2/2015 | Vannithamby et al. |
| 2015/0045060 A1 | 2/2015 | Fong et al. |
| 2015/0055524 A1 | 2/2015 | Sirotkin et al. |
| 2015/0063104 A1 | 3/2015 | Zhu et al. |
| 2015/0327301 A1 | 11/2015 | Fong et al. |
| 2015/0349942 A1 | 12/2015 | Chatterjee et al. |
| 2015/0365937 A1 | 12/2015 | Etemad et al. |
| 2016/0014662 A1 | 1/2016 | Yiu et al. |
| 2016/0044615 A1 | 2/2016 | Bashar et al. |
| 2016/0164656 A1 | 6/2016 | Khoryaev et al. |
| 2016/0261387 A1 | 9/2016 | Etemad et al. |
| 2016/0381708 A1 | 12/2016 | Li et al. |
| 2018/0167974 A1 | 6/2018 | Li et al. |

OTHER PUBLICATIONS

Intel Corporation, "Further enhancements on signalling reduction to enable light connection for LTE" RP-160425, 3GPP TSG RAN Meeting #71, Gothenburg, Sweden, Mar. 7-10, 2016, pp. 1-7.

* cited by examiner

METHOD AND APPARATUS FOR CHANGING CONNECTION STATE OF TERMINAL

CROSS REFERENCE TO RELATED APPLICATIONS

This application is a National Stage Patent Application of PCT International Patent Application No. PCT/KR2017/004432 (filed on Apr. 26, 2017) under 35 U.S.C. § 371, which claims priority to Korean Patent Application Nos. 10-2016-0054937 (filed on May 3, 2016), 10-2016-0054936 (filed on May 3, 2016), and 10-2017-0053295 (filed on Apr. 26, 2017), the teachings of which are incorporated herein in their entireties by reference.

TECHNICAL FIELD

The present disclosure relates to a method and apparatus for performing control plane signaling to reduce signaling resulted from the transition of a connection state of user equipment. More specifically, the present disclosure relates to a method and apparatus for changing a connection state by user equipment in a light connection state using a paging message.

DESCRIPTION OF THE RELATED ART

Various types of wireless terminals have been introduced to consumers such as companies and individuals. Mobile communication systems adopting the technologies based on the 3rd generation partnership project (3GPP), such as Long Term Evolution (LTE), LTE-Advanced, or the like, have been required to be developed for transmitting and receiving at a high-speed a large amount of various data, such as video data, radio data, or the like.

Data transmission and/or reception through mobile communication systems are rapidly increasing as the number of user equipment devices using machine type communication (hereinafter, referred to as "MTC") has increased. Meanwhile, the MTC periodically transmits and/or receives a small amount of data. Accordingly, low-power and/or low-cost user equipment may be used for MTC.

Accordingly, there is a growing need for techniques for enabling user equipment to consume less power to transmit and/or receive data.

In particular, when user equipment transmits a small amount of data periodically or aperiodically, it is necessary to change a radio resource control (RRC) connection state. However, in order to change a connected (RRC connected) state by the typical method, it is necessary to perform complicated data transmission and reception procedures between user equipment and a base station and between a base station and a core network.

Such transmission/reception procedures cause a relatively significantly high data load. That is, the transmission/reception procedure causes an unnecessary data overload for changing an RRC connection state for transmitting a small amount of data.

Furthermore, a data load of the entire communication system significantly increases, as the number of user equipment devices periodically transmitting small amounts of data increases.

Accordingly, there is a need for a method and a procedure for enabling the user equipment to change a connection state without seriously increasing the data load of the entire communication system. In addition, there is a need for a method to process a paging message at such a connection state introduced for reducing a data load.

DETAILED DESCRIPTION OF THE INVENTION

Technical Problem

The present disclosure is related to a method and apparatus for reducing load of a communication system and quickly performing data transmission and/or reception, by defining a light connection state in addition to a radio resource control (RRC) connected state and an RRC idle state.

In addition, the present disclosure is related to a specific operation of user equipment when the user equipment receives a paging message from a base station when the user equipment is in the light connection state.

Technical Solution

In accordance with an aspect of the present disclosure, a method may be provided for changing a connection state by user equipment. The method may include receiving, from a base station, an radio resource control (RRC) message including instruction information for instructing state transition into a light connection state, configuring the connection state of the user equipment into the light connection state based on the instruction information, receiving a paging message for the user equipment, and determining to change the connection state of the user equipment based on a user equipment identifier included in the paging message.

In accordance with another aspect of the present disclosure, a method for controlling a connection state of user equipment is provided, the method including transmitting, to the user equipment, an radio resource control (RRC) message including instruction information for instructing state transition into a light connection state, changing the connection state of the user equipment into the light connection state, and triggering the connection state of the user equipment to be changed by transmitting a paging message including a user equipment identifier, the changing of the connection state of the user equipment into the light connection state including suspending all of a signaling radio bearer (SRB) and a data radio bearer (DRB) of the user equipment, while storing a user equipment context.

In accordance with further another aspect of the present disclosure, user equipment changing a connection state is provided, the user equipment including a receiver configured to receive, from a base station, an radio resource control (RRC) message including instruction information for instructing state transition into a light connection state, the receiver further receiving a paging message for the user equipment, and a controller configuring the connection state of the user equipment into the light connection state based on the instruction information, the controller determining to change the connection state of the user equipment based on a user equipment identifier included in the paging message.

In accordance with yet another aspect of the present disclosure, a base station controlling a connection state of user equipment is provided, the base station including a transmitter configured to transmit, to the user equipment, an radio resource control (RRC) message including instruction information for instructing state transition into a light connection state, the transmitter triggering the connection state of the user equipment to be changed by transmitting a paging message including a user equipment identifier, and a controller configured to change the connection state of the user equipment into the light connection state by suspending all of a signaling radio bearer (SRB) and a data radio bearer (DRB) of the user equipment, while storing a user equipment context.

Advantageous Effects

According to some embodiments of the present disclosure, user equipment may be enabled to perform a relatively simple signaling procedure for changing a connection state. Thereby, it is possible to reduce the entire data load of the communication system.

In addition, according to some embodiments of the present disclosure, a specific method of processing a paging message is provided when user equipment is in a light connection state. Thereby, it is possible to prevent the ambiguity of operations for paging message processing by the user equipment.

MODE FOR CARRYING OUT THE INVENTION

Figure 1:
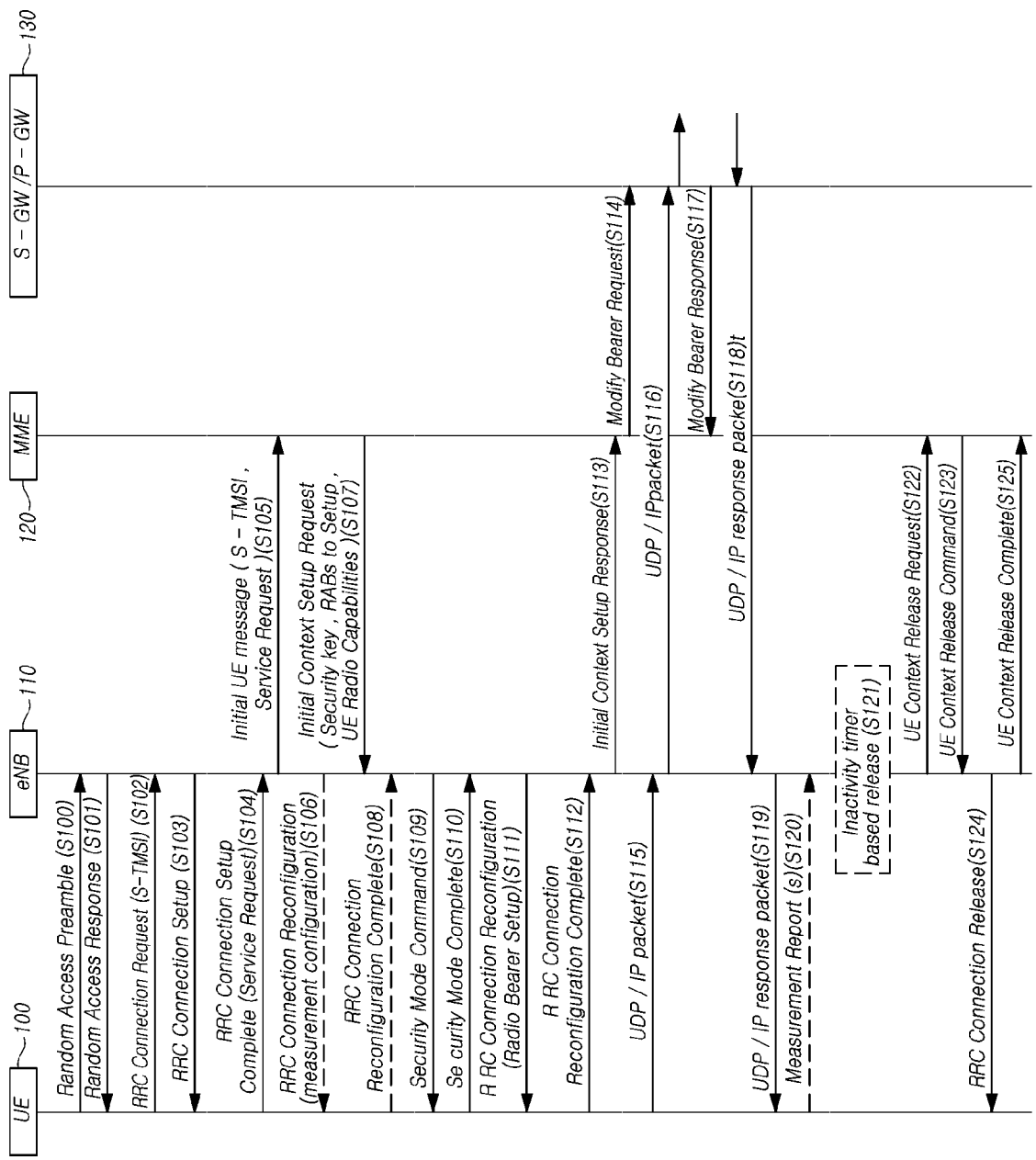
FIG. 1 is a signal flow diagram illustrating a procedure for changing a connection state of user equipment.

Hereinafter, the present preferred embodiments of the disclosure will be described in detail with reference to the accompanying drawings. In denoting elements of the drawings by reference numerals, the same elements will be referenced by the same reference numerals although the elements are illustrated in different drawings. In the following description of the disclosure, detailed description of known functions and configurations incorporated herein may be omitted when it may make the subject matter of the disclosure rather unclear.

A machine type communication (MTC) device may refer to a device that supports low cost (or low complexity), a device that supports coverage enhancement, or the like. The MTC device may refer to a device that supports low cost (or low complexity), a device that supports coverage enhancement, or the like. The MTC device may refer to devices defined in a predetermined category for supporting low cost (or low complexity) and/or coverage enhancement.

In other words, the MTC device may refer to a low cost (or low complexity) user equipment (UE) category/type newly defined in 3GPP Release-13 and performing LTE-based MTC-related operations. The MTC device may refer to a UE category/type defined in or before 3GPP Release-12, which supports enhanced coverage in comparison with the typical LTE coverage or supports low power consumption, or may refer to a low cost (or low complexity) UE category/type newly defined in Release-13.

A wireless communication system are widely established to provide various communication services, such as voice communication, packet data service, etc. The wireless communication system includes user equipment (UE) and a base station (BS, or eNB). The UE is defined as a generic term including devices used in wireless communication, and therefore includes as well as UEs in the wideband code division multiple access (WCDMA), long term evolution (LTE), high speed packet access (HSPA), and the like, a mobile station (MS) in the global system for mobile communications (GSM), a user terminal (UT), a subscriber station (SS), a wireless device, or the like.

The BS or a cell generally refers to a station communicating with the UE. The BS or cell may be referred to as a Node-B, an evolved Node-B (eNB), a sector, a site, a base transceiver system (BTS), an access point, a relay node, a remote radio head (RRH), a radio unit (RU), a small cell, or the like.

That is, the BS or cell is defined as a generic term including as well as some areas or functions covered by a base station controller (BSC) in CDMA, a Node-B in the WCDMA, an evolved Node-B (eNB) or a sector (site) in the LTE, and the like, all of various coverage areas, such as a megacell, a macrocell, a microcell, a picocell, a femtocell and a relay node, RRH, RU, a small cell communication range, or the like.

Since each of the above-described various cells are controlled by a BS, therefore the BS may be classified into two categories. That is, the BS may be referred to i) an apparatus that provides a megacell, a macrocell, a microcell, a picocell, a femtocell, or a small cell, for a radio coverage area, or ii) the radio coverage area itself. In i), the BS may be referred to a) apparatuses for providing any radio coverage area by being controlled by one identical entity, or b) apparatus that cooperate with one another to configure the radio coverage area. According to a method of establishing a radio coverage area, an example of the BS may be an eNB, a RRH, an antenna, a RU, a low power node (LPN), a point, a transmission/reception point, a transmission point, a reception point, or the like. In ii), the BS may be a radio coverage area itself for transmitting or receiving a signal from UE perspective or neighboring BS perspective.

Accordingly, the megacell, the macrocell, the microcell, the picocell, the femtocell, or the small cell, the RRH, the antenna, the RU, the LPN, the point, the eNB, the transmission/reception point, the transmission point, or the reception point are collectively referred to as the BS.

The UE and the BS are entities performing transmission or reception operation used to embody the technology and technical spirit described in the present disclosure. The UE and the BS are defined as a generic term and not limited to specific terms or words. The UE and the BS are entities performing uplink or downlink operation used to embody the technology and technical spirit described in the present disclosure. The UE and the BS are defined as a generic term and not limited to a specific term or word. The uplink (UL) refers to a data transmission/reception scheme by a UE to/from a BS, and the downlink (DL) refers to a data transmission/reception scheme by a BS to/from a UE.

Any of multiple access techniques may be applied to wireless communication systems according to the present disclosure, and therefore no limitation is imposed on them. Various multiple access techniques, such as code division multiple access (CDMA), time division multiple access (TDMA), frequency division multiple access (FDMA), orthogonal frequency division multiple access (OFDMA), OFDM-TDMA, OFDM-FDMA, OFDM-CDMA, or the like, can be used in wireless communication systems according the present disclosure. At least one of embodiments of the present disclosure may be applied to resource allocation in as well as asynchronous wireless communication evolving into LTE/LTE-advanced and IMT-2020 beyond GSM, WCDMA, and HSPA, synchronous wireless communication evolving into CDMA, CDMA-2000, and UMB. The present disclosure is not construed to be limited to or limited to a particular wireless communication field and is construed as including all technical fields to which the spirit of the present disclosure may be applied.

Uplink transmission and downlink transmission may be performed based on i) a time division duplex (TDD) technique performing the transmission through different time slots or ii) a frequency division duplex (FDD) technique performing the transmission through different frequencies.

Further, in some systems, such as the LTE or LTE-advanced, a related standard specification defines an UL and a DL to be established based on a single carrier or a pair of carriers. The UL and/or the DL may be established by one or more control channels, such as a physical DL control channel (PDCCH), a physical control format indicator channel (PCFICH), a physical hybrid ARQ indicator channel (PITCH), a physical UP control channel (PUCCH), an enhanced physical DL control channel (EPDCCH), or the like, through which control information is transmitted, and may be established by one or more data channels, such as a physical DL shared channel (PDSCH), a physical UL shared channel (PUSCH), or the like, through which data are transmitted.

Meanwhile, control information may be transmitted through an enhanced PDCCH (EPDCCH) or extended PDCCH (EPDCCH).

In the present disclosure, the cell may refer to a coverage of a signal transmitted from a transmission point or a transmission/reception point, a component carrier having the coverage of the signal transmitted from the transmission point or the transmission/reception point, or the transmission/reception point itself.

A wireless communication system according to some embodiments of the present disclosure may be i) a coordinated multi-point transmission/reception system (CoMP system) in which two or more transmission/reception points cooperate to transmit a signal, ii) a coordinated multi-antenna transmission system, or iii) a coordinated multi-cell communication system. The CoMP system may include at least two multiple transmission/reception points and UEs.

The multiple transmission/reception points may be at least one RRH that is connected to a BS or macrocell (hereinafter, referred to as 'eNB') through an optical cable or an optical fiber and thereby controlled in a wired manner, and that has high transmission power or low transmission power in a macrocell area.

Hereinafter, the DL may denote communication or a communication path from multiple transmission/reception points to a UE. The UL may refer to communication or a communication path from the UE to the multiple transmission/reception points. In the DL, a transmitter may be a part of multiple transmission/reception points and a receiver may be a part of the UE. In the UL, a transmitter may be a part of the UE and a receiver may be a part of multiple transmission/reception points.

Hereinafter, transmission and reception of a signal through a channel such as the PUCCH, the PUSCH, the PDCCH, or the PDSCH, may be described as the transmission and reception of the PUCCH, the PUSCH, the PDCCH, or the PDSCH.

In addition, hereinafter, a description of transmitting or receiving a PDCCH or a description of transmitting or receiving a signal through the PDCCH includes transmitting or receiving an EPDCCH or transmitting or receiving a signal through the EPDCCH.

That is, a physical DL control channel used herein may denote a PDCCH or an EPDCCH and may denote both of the PDCCH and the EPDCCH.

Also, for convenience of description, an EPDCCH according to at least one of embodiments of the present disclosure may be applied to a description or an embodiment described using a PDCCH, and the PDCCH may also be applied to a description or an embodiment described using the EPDCCH.

Meanwhile, higher layer signaling described below includes radio resource control (RRC) signaling transmitting RRC information containing an RRC parameter.

The eNB performs DL transmission to UEs. The eNB may transmit a) a PDSCH which is a primary physical channel for unicast transmission and b) a PDCCH for transmitting i) DL control information such as scheduling required to receive the PDSCH and ii) scheduling approval information for transmission through an UL data channel (for example, a PUSCH). Hereinafter, transmission and reception of a signal through each channel will be described as transmission and reception of a corresponding channel.

Connection State Transition Procedure of UE

In the typical mobile communication technology, a UE state and a network state are classified into a UE idle state or a connected state. The UE state corresponds to the network state. For example, a state of a radio network (E-UTRAN) corresponds to a state of a core network (e.g., a radio resource control (RRC) state and an ECM state). That is, when a UE transitions into the RRC idle state, the UE enters the ECM idle state, and when transitions into the RRC connected state, the UE enters the ECM connected state. A complicated signaling process as illustrated in FIG. 1 is required to be performed so that a UE in the idle state transmits data, according to a corresponding UE state. In particular, there occurs a large overhead when the UE transmits a small amount of data.

FIG. 1 is a signal flow diagram illustrating a typical procedure for changing a connection state of a UE.

Referring to FIG. 1, a UE 100 transmits a random access preamble to a BS 110 so that the UE 100 transitions from the RRC idle state into the RRC connected state in order to transmit data at step S100. Thereafter, the UE 100 receives a random access response from the BS 110. Next, the UE 100 requests an RRC connection reconfiguration to the BS 110 at step S102.

The BS 110 sets up an RRC connection setup at the UE 100 at step S103. Then, the UE 100 reports the completion of the RRC connection setup at step S104.

When the RRC connection setup at the UE 100 is completed, the BS 110 transmits an initial UE message to an MME 120 to request a service at step S105. The MME 120 requests an initial context setup to the BS 110 at step S107. The BS 110 may transmit an RRC connection reconfiguration message to the UE 100 and set up a measurement configuration at step S106, between the step S105 and the step S107. When the measurement configuration is completed, the UE 100 transmits the RRC connection reconfiguration message to the BS 110 at step S108.

The BS 110 transmits a security mode command to the UE 100 at step S109, and the BS 110 receives a response thereto at step S110.

Next, the BS 110 transmits the RRC connection reconfiguration message for radio bearer setup to the UE 100 at step S111, and the BS 110 receives a response thereto at step S112. The BS 110 transmits a response to the initial context setup to the MME 120 at step S113, and the MME 120 transfers a bearer modification request to a gateway 130 at step S114.

The UE 100 transmits a UDP/IP packet to the BS 110 at step S115, and the BS 110 transfers a corresponding packet to the gateway 130 at step S116. The gateway 130 transfers a response to the bearer modification request to the MME 120 at step S117, and the gateway 130 transfers a response to the UDP/IP packet to the BS 110 at step S118. The BS 110 transfers the corresponding packet to the UE 100 at step S119.

Through these procedures, the UE 100 transmits a packet to a core network.

Next, the UE 100 transmits a measurement report to the BS 120 according to a measurement configuration periodically or when an event occurs at step S120. The BS 120 determines whether the RRC connected state of the UE 100 is released based on the measurement report or a deactivation timer at step S121. When it is determined that the RRC connected state of the UE 100 is released, the BS 100 requests a UE context release to the MME 120 at step S122. The MME 120 indicates the UE context release to the BS 110 at step S123, and thereby the BS 110 indicates an RRC connection release to the UE 100 at step S124.

The BS 110 releases the RRC connected state of the UE 100, and then, the BS 10 transmits a response to the MME 120 at step S125.

Through these procedures, the UE in the RRC connected state may be transitioned into the RRC idle state.

As described above, in the related art, a plurality of signaling procedures between the UE and the BS and between the BS and the core network are required so that the UE transitions from the RRC idle state into the RRC connected state or from the RRC connected state into the RRC idle state. In such procedures, when the UE periodically transmits a small amount of data, an overhead continuously occurs. Meanwhile, the UE may maintain its connection state to reduce the overhead resulted from the state transition. However, in this case, even though there is no data transmission, it is necessary to periodically measure a network state and report the measurement results, according to a measurement configuration, and thereby the power of the UE can be unnecessarily consumed. In addition, in a case where the RRC connected state is maintained, there is a problem that a handover signaling overhead increases due to the movement of the UE.

Connection State Transition Procedure for a NB-IoT UE

A narrow band (NB) Internet of Thing (IoT) UE may be operated in a fixed state, and the NB IoT UE may be installed in a specific location or located within a specific range. This characteristic causes an NB-IoT UE and a BS to support a suspension/resumption procedure. Through an RRC connection release message, the BS may request the UE to maintain an access stratum (AS) context in the RRC idle state. When the UE transitions into the RRC idle state by receiving the RRC connection release message including RRC suspension information (or before the BS transmits the above-described message to the UE), the BS transmits an S1 message requesting the state transition of the corresponding UE to a core network and enters the ECM idle state.

An RRC connection resumption procedure is used for transitioning from a RRC idle state to a RRC connected state, and, at this time, information previously stored in a UE and a BS is used for resuming the RRC connection state. When the UE transitions into the RRC connected state by initiating the RRC connection resumption procedure (after the BS has transmitted an RRC connection resumption message to the UE), the BS transmits the S1 message requesting state transition of the corresponding UE to the core network and enters the ECM connected state.

However, likewise, since the transition to the RRC connected state and the ECM connected state are performed at the same time. Thereby, there is a problem that an unnecessary overhead occurs between the BS and the core network. That is, as described above, in the typical mobile communication technology, there is a signaling overhead problem resulted from state transition, and the suspension/resumption procedure, by which the signaling overhead can be reduced, for a UE in a fixed location is applicable to only an NB-IoT UE. Accordingly, if the UE moves away from a cell (or a BS) that has provided an AS context previously stored in the UE, a service request procedure, as shown in FIG. 1, is required to transmit UL data by the UE. In addition, since transition of a UE between a suspension state and a resumption state is the same as transition of between an idle state and a connected state, there is a problem of continuously causing core network signaling (S1 signaling).

To solve this problem, a specific procedure is proposed for changing only a radio network connection state without core network signaling.

In the related art, since a radio network connection state transition is performed based on signaling and user data occurred in a higher layer (e.g., non access stratum, IP, GTP, etc.) of an access stratum (AS), it is necessary for a UE and a BS to perform specific operation procedures in order to change only the radio network connection state without core network signaling.

In addition, in a case where only the radio network connection state is changed without core network signaling, incoming data for a corresponding UE cannot be received properly. As a method to solve this problem, a method to trigger paging by a radio network itself may be applicable, but a specific method has not been proposed either. In particular, paging in the related art is triggered by a core network. Therefore, there may be a problem that a method of triggering paging in the radio network can not sufficiently provide a paging function triggered through the core network.

The typical mobile communication technology has a problem of signaling overhead resulted from state transition. Core network signaling (S1 signaling) cannot be reduced even by the suspension/resumption procedure although the suspension/resumption procedure reduces the signaling overhead. To solve this problem, only the radio network connection state may be changed without core network signaling. However, such a method has not been introduced. In particular, in a case where only the radio network connection state is changed without core network signaling, incoming data for a corresponding UE cannot be received properly. To solve this problem, a method of triggering paging by a radio network has not been introduced either. In particular, there is a problem that a paging function triggered by the core network cannot be sufficiently provided using the method of triggering paging in the radio network.

To solve the problems described above, a specific method may be proposed for performing radio network state transition by a UE and a BS without further core network signaling to reduce the signaling overhead of a core network in accordance with at least one embodiment. In addition, a method and an apparatus may be provided for causing a UE having performed radio network state transition without further core network signaling to effectively process incoming data in accordance with at least one embodiment. In addition, according to some embodiments of the present disclosure, when a UE receives a paging message, a method may be provided for effectively operating considering the situation of the UE.

Embodiments described below may be applied to UEs using all mobile communication technologies. For example, some embodiments of the present disclosure may be applied not only to mobile communication UEs to which LTE technology is applied but also to next generation mobile communication (for example, 5G mobile communication) UEs. For convenience of description, a BS may denote an eNode-B of LTE/E-UTRAN, or denote at least one of a central unit (CU), a distribute unit (DU), and an object in which the CU and the DU are implemented as one logical object, in a 5G radio network in which the CU is separated from the DU.

Methods of Performing Radio Network State Transition Without Further Core Network Signaling To reduce signaling resulted from state transition of a UE, the BS may instruct the UE to perform some or all operations (e.g., one or more operations of cell re-selection, paging, radio resource release/suspension, and some radio resource maintenance/standby) of the RRC idle state in order for the UE to consume power similar to an amount of power consumed in the RRC idle state while the BS maintains a connection state (e.g., an S1 connection in the LTE or an interface connection between a BS and a core network in 5G) between the BS and the core network for the UE.

For convenience of description, according to some embodiments of the present disclosure, a light connection state is defined as a state for the UE to perform some or all operations of the RRC idle state while a control plane or user plane connection is maintained through interfaces of the BS and the core network for the UE. The light connection state may be referred to various terms, but not limited to, such as a new RRC state, a sub-state of the RRC connection, a UE mobility-providing connection state, a radio network paging state, a connection standby state, an RRC idle state maintaining an S1 connection, an RRC idle state maintaining a core network connection, an S1 connection standby state, a light connected state, RRC INACTIVE state, or the like.

In addition, in the RRC connected state, when a BS instructs a UE in the RRC connected state to transition into the light connection state, it is possible for the BS not to transmit a UE context release request message to the core network. That is, signaling is not performed for releasing a connection over interfaces between the core network and the BS. Alternatively, an (S1) connection over interfaces between the core network and the BS is maintained. For reference, in the related art, when releasing the RRC connection state of the UE, the BS transmits the UE context release request message to an MME to request release from a logical S1 connection associated with the UE.

Thus, in the present disclosure, description is given using a light connection state newly defined for a connection state of a UE, but as described above, since the light connection state is merely an exemplary name denoting a state in which the UE performs some operations in the RRC idle state while a connection between a BS and a core network for the UE is maintained, therefore the present disclosure is not limited to the corresponding name.

Hereinafter, a method of a UE for transitioning a state into the light connection state, and a paging message processing method of the UE in the light connection state are described, referring to related figures, according to some embodiments of the present disclosure.

Figure 2:
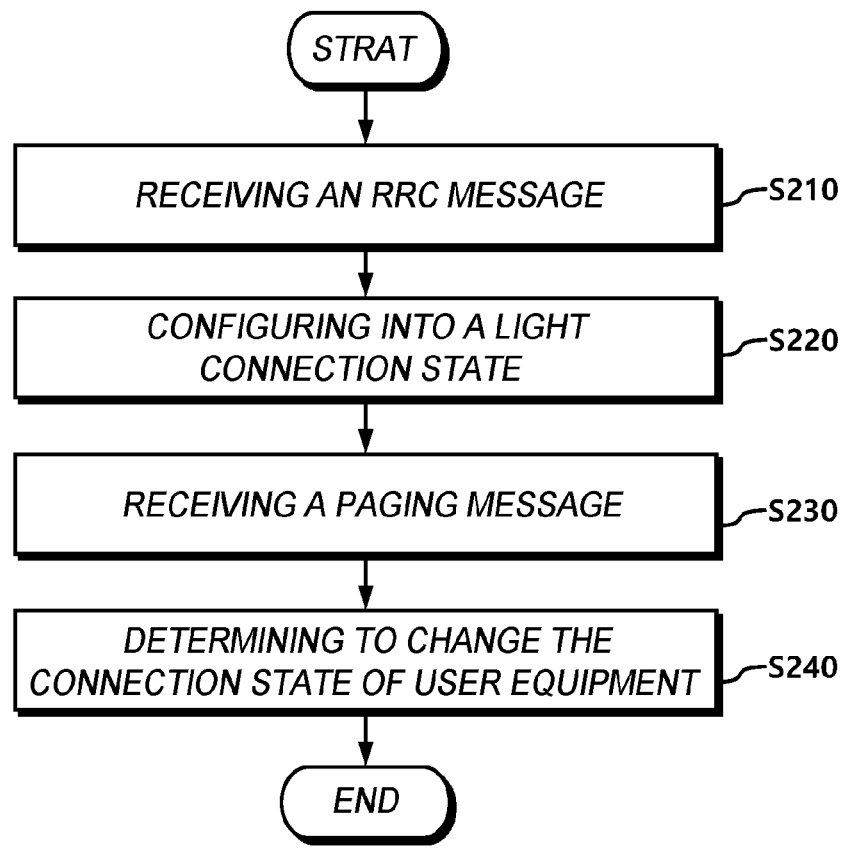
FIG. 2 is a flowchart illustrating operation of user equipment according to some embodiments of the present disclosure.

FIG. 2 is a flowchart illustrating operation of a UE according to some embodiments of the present disclosure.

Referring to FIG. 2, to change its connection state, a UE performs an operation for receiving, from a BS, a radio resource control (RRC) message including instruction information for instructing state transition into the light connection state S210. The instruction information for instructing the state transition of the UE into the light connection state may be transmitted by the BS. For example, the instruction information may be received being included in an RRC connection release message. For another example, the instruction information may be included in an RRC connection reconfiguration message. If the instruction information is received, the UE is required to perform an operation for changing the connection state with the BS into the light connection state.

Meanwhile, it is necessary for the BS to recognize that the corresponding UE supports the light connection state. To do this, the UE may transmit UE capability information to the BS prior to step S210 and cause the BS to recognize whether the UE supports the light connection state.

In addition, the UE performs an operation for configuring its connection state into the light connection state based on the instruction information S220. For example, when received instruction information indicating state transition into the light connection state from the BS, the UE suspends all signaling radio bearer (SRB) and dedicated radio bearer (DRB) related to the BS. At this time, the UE may store a UE context, unlike the RRC idle state. In this case, the BS may store the UE context of the corresponding UE too. As a result, when the UE transitions from the light connection state into the RRC connected state, the UE and the BS are able to perform quick data transmission/reception using the stored UE context again. In addition, when the UE in the light connection state moves, the UE may be able to perform a cell re-selection operation other than a handover operation. That is, since the RRC connection of the UE is similar to a state in which a connection with a BS is released, as the UE moves, the cell re-selection procedure may be performed.

The UE performs an operation for receiving a paging message related for the UE at step S230.

The paging message for the UE in the light connection state may be a paging message triggered by a core network or a RAN-initiated paging message. The RAN-initiated paging message denotes a paging message triggered in the BS or in an RRC layer of the BS other than a paging message triggered by a core network or a higher layer (e.g., non access stratum) of the core network.

Meanwhile, the paging message may include a UE identifier. The UE identifier may be one of a first UE identifier allocated by a higher layer (e.g., non access stratum) of the UE and a second UE identifier allocated by the BS.

The UE performs an operation for determining to change the connection state of the UE based on the UE identifier included in the paging message at step S240. For example, when the paging message is received, the UE extracts a UE identifier from the paging message, compares the extracted UE identifier with a UE identifier stored in its memory to identify whether these UE identifier are the same, and determines to change the connection state of the UE according to the compared results.

For example, when the UE identifier included in the paging message is identical to the first UE identifier allocated by a higher layer of the UE, the UE may determine to change the connection state of the UE into the RRC idle state. For another example, when the UE identifier included in the paging message is identical to the second UE identifier allocated by the BS, the UE may determine to change the connection state of the UE into the RRC connected state.

Meanwhile, the first UE identifier may be an international mobile subscriber identity (IMSI) or a SAE-temporary mobile subscriber identity (S-TMSI). The second UE identifier may be comprised of BS identification information and information for identifying a UE context allocated by the BS.

In this manner, when a paging message is received, the UE in the light connection state may change its connection state into the idle state or a connected state according to which identifier the UE identifier of the received paging message is matched to.

Figure 3:
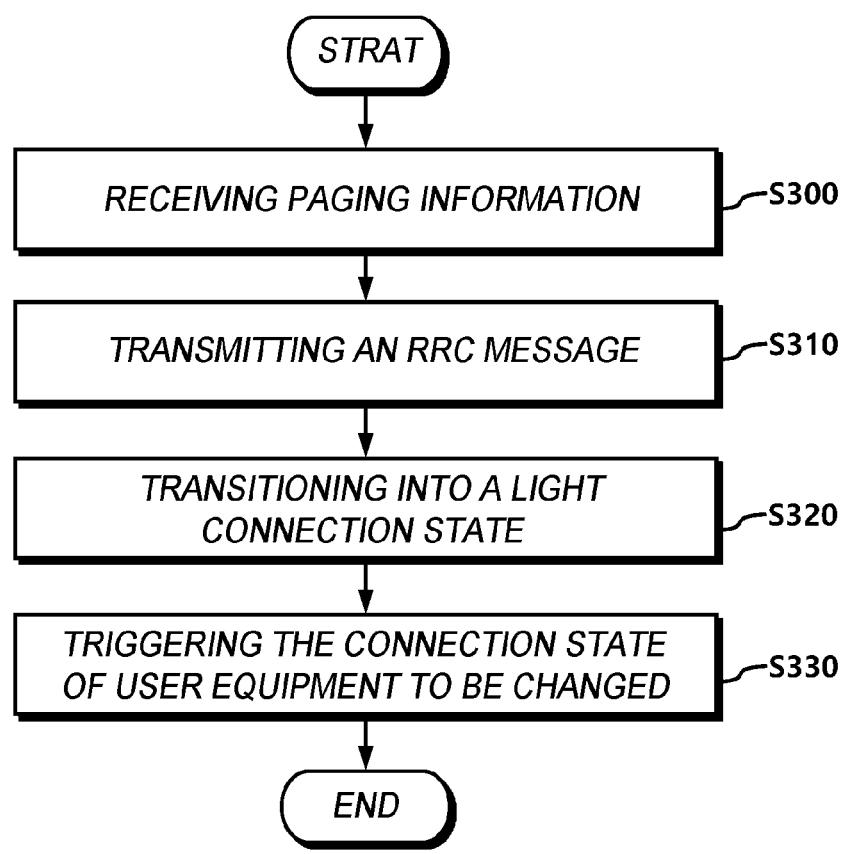
FIG. 3 is a flowchart illustrating operation of a base station according to some embodiments of the present disclosure.

FIG. 3 is a flowchart illustrating operation of a BS according to some embodiments of the present disclosure.

Referring to FIG. 3, for controlling a connection state of a UE, a BS performs an operation for transmitting, to the UE, a radio resource control (RRC) message including instruction information for instructing the UE to perform state transition into the light connection state at step S310. For example, the instruction information may be transmitted being included in an RRC connection release message. In this case, it is necessary for the BS to recognize whether the corresponding UE supports the light connection state. To do this, the BS receives UE capability information from the UE prior to step S310 and thereby being able to recognize whether the UE supports the light connection state.

The BS performs an operation for changing the connection state of the UE into the light connection state at step S320. For example, when the UE is transitioned into the light connection state, the BS suspends all SRB and DRB related to the UE. In this case, the BS may store a UE context of the corresponding UE, unlike the RRC idle state. As a result, when the UE transitions back from the light connection state into the RRC connected state, the UE and the BS may be able to perform fast data transmission/reception using the stored UE context again.

The BS performs an operation for triggering the connection state of the UE to be changed by transmitting a paging message including a UE identifier to the UE at step S330. The BS may transmit a paging message to the UE in the light connection state. For example, the paging message may be a paging message triggered by a core network or an RAN-initiated paging message.

The UE identifier included in the paging message may be one of a first UE identifier allocated by a higher layer (e.g., non access stratum) of the UE and a second UE identifier allocated by the BS. For example, the first UE identifier may be an international mobile subscriber identity (IMSI) or a SAE-temporary mobile subscriber identity (S-TMSI). The second UE identifier may include i) BS identification information and ii) information for identifying a UE context allocated by the BS.

As described above, in a case where the paging message includes the first UE identifier, the connection state of the UE may be transitioned into the RRC idle state. On the contrary, in a case where the paging message includes the second UE identifier, the connection state of the UE may be transitioned into the RRC connected state.

Meanwhile, the BS may perform a further operation for receiving paging information for transmitting a paging message from a core network control plane entity at step S300. Although FIG. 3 illustrates that the step S300 is performed prior to the step S310, the step S300 may be performed at various time points, if necessary, before the paging message is transmitted. That is, before transmitting a paging message to the UE, the BS may receive paging information from the core network control plane entity.

For example, the core network control plane entity may be a MME. The MME may transmit paging information required to transmit a paging message by the BS to the UE to the BS. For example, the paging information may be received being included in an initial context setup request message. For another example, the paging information may be included one or more of paging DRX (discontinuous reception), UE identification information indexes and cell area information.

The BS may transmit a paging message to the UE, in the light connection state using paging information.

As described above, the specific method of changing the connection state of the UE into the light connection state by an instruction of the BS, the procedure for transmitting a paging message to the UE, in the light connection state, and the method of changing the connection state of the UE according to the reception of the paging message were described.

Hereinafter, according to some embodiments of the present disclosure, specific procedures for a UE to perform state transition into the light connection state and receive and process a paging message in the light connection state will be discussed for each procedure.

Embodiments for Transmitting Whether a UE Supports the Light Connection

To provide a suitable configuration to a UE, a BS is required to correctly recognize the UE (in this disclosure, referred to as a UE or a device for convenience of description, but it may refer to a 5G device as well as an LTE device) capability. RRC signaling carries AS capabilities and NAS signaling carries NAS capabilities. A core network control plane entity (for example, MME, hereinafter referred to as MME) stores UE capabilities (or UE capability which is comprised of UE radio access capability and UE core network capability).

As an example of this, the UE core network capability may be indicated by a UE through NAS signaling (attach procedure, etc.). For another example, the UE radio access capability may be transmitted from the UE to the BS using a UE capability transfer procedure and transmitted via an S1 interface. In further another example, the UE radio access capability may be indicated to a MME by a UE through the NAS signaling (attach procedure, etc.), and transmitted to a BS via the S1 interface.

If available, the MME transmits the UE radio access capability to the BS whenever the UE enters RRC-connected. For example, the MME may transmit UE radio capability to the BS through an S1 initial context setup request message.

The BS may request UE capability information to the UE, if necessary. For example, after completion of a handover procedure, the BS may acquire the UE capability information from the UE using the UE capability transfer procedure and transfer the acquired information to the MME.

For example, information for indicating whether to support a light connection may be defined in the UE capability information (e.g., UE radio capability information). For another example, the information for indicating the supporting of the light connection may be defined by modifying/extending the UE capability information for NB-IoT suspension/resumption (or AS context caching).

The BS may receive the information for indicating that the UE supports the light connection using the above-described methods.

Embodiments for Changing a Connection State into a Light Connection State

As described above, a BS may identify whether a corresponding UE supports the light connection using the UE capability information. The BS may transmit instruction information for changing the connection state of the UE into the light connection state, if necessary.

Hereinafter, according to some embodiments of the present disclosure, methods and apparatuses for transmitting, by a BS, the instruction information and for configuring, by a UE, the light connection state will be described for each embodiment. The respective embodiments may be performed individually or in combination.

1) Defining a New Release Cause in an RRC Connection Release Message and Indicating the Defined Release Cause When recognizing that a UE supports the light connection, a BS may transmit an RRC connection release message for indicating the light connection as a release cause to the UE.

The UE having received the RRC connection release message indicating the light connection as the release cause may perform an operation for the light connection state.

The operation of the UE for the light connection state may denote performing one or more operations of the following operations.

Storing a UE context

Storing UE identification information of the light connection state

Performing some or all operations (e.g., one or more operations of cell re-selection, paging, radio resource release/suspension) of the RRCidle UE.

1-1) Embodiments for Processing the Light Connection State without Reporting it to a Higher Layer The UE having received the RRC connection release message indicating the light connection as the release cause may not inform the light connection state to a higher layer (non access stratum (NAS) and/or user plane radio bearer higher layer) to hide the state transition to the higher layer. In this case, the higher layer is unable to identify the light connection state.

For example, when transmission data (for example, MO data) to be transmitted is generated in the light connection state, considering the RRC connected state, the corresponding UE transfers the transmission data to a PDCP buffer mapped to a corresponding bearer. In a case where a radio resource suspension operation is performed according to transition into the light connection state and thereby a PDCP entity is suspended, data transmission cannot be performed. Accordingly, if the UE having received the RRC connection release message indicating the light connection as the release cause does not report the light connection state to a higher layer, the PDCP is required to be maintained in the light connection state (or the PDCP is required to be maintained identically to the connection state). When data is received in the PDCP buffer, it is necessary for the transition into the RRC connected state to be initiated. For example, when a UE in the light connection state receives a PDCP SDU from a PDCP entity, the UE may request transitioning from the light connection state to a connection state.

For another example, if transmission signaling (for example, MO signaling or NAS signaling) to be transmitted in the light connection state is generated, a UL information transfer RRC message may be transmitted to the BS, considering being in the RRC connected state. Since a UE RRC entity may recognize that the UE is in the light connection state, if transmission signaling (for example, MO signaling or NAS signaling) to be transmitted is generated, transitioning into the RRC connected state may be initiated.

1-2) Embodiments for Informing the Light Connection State of a Higher Layer and Changing Only the RRC Connected State The UE having received an RRC connection release message indicating the light connection as the release cause may report the light connection state to a higher layer. In this case, the higher layer may be able to identify the light connection state.

For example, if transmission data (for example, MO data) to be transmitted in the light connection state is generated, the higher layer (for example, NAS) of the UE may not trigger a service request procedure. If transmission data (for example, MO data) to be transmitted in the light connection state is generated, a higher layer (for example, NAS) of the UE may instruct a lower layer (for example, RRC) to perform transitioning from the light connection state into the RRC connected state. If a transition indication from the light connection state into the RRC connected state is received from the higher layer, the RRC may initiate the transition from the light connection state into the RRC connected state. Even if state transition from the light connection state into the RRC connected state is not indicated by the higher layer, the RRC may detect transmission data to be transmitted that are generated in the higher layer and initiate the transition from the light connection state into the RRC connected state.

For another example, if transmission signaling (for example, MO signaling or NAS signaling) to be transmitted in the light connection state is generated, the higher layer (for example, NAS) of the UE may not trigger a service request procedure. If transmission signaling to be transmitted in the light connection state is generated, the higher layer (for example, NAS) of the UE may indicate the lower layer (for example, RRC) to perform transitioning from the light connection state into the RRC connected state. If a transition indication from the light connection state into the RRC connected state is received from the higher layer, the RRC may initiate the transition from the light connection state into the RRC connected state. That is, if a transition indication from the light connection state into the RRC connected state is received over the RRC from the higher layer, the RRC may initiate the transition from the light connection state into the RRC connected state.

In a case where the transition instruction from the light connection state into a connection state is received from the higher layer and the transition into the RRC connected state is initiated, the UE does not need to transmit corresponding NAS signaling information (e.g., a transition instruction into the light connection state) to a core network via the BS.

1-3) Embodiments for Informing the Light Connection State of a Higher Layer and Performing a Higher Layer Procedure The UE having received an RRC connection release message indicating the light connection as the release cause may indicate the light connection state to a higher layer. In this case, the higher layer may be able to identify the light connection state.

For example, if transmission data (for example, MO data) to be transmitted in the light connection state is generated, the higher layer (for example, NAS) of the UE may trigger a service request procedure.

For another example, if transmission data (for example, MO data) to be transmitted in the light connection state is generated, the higher layer (for example, NAS) of the UE may trigger a NAS procedure (e.g., attach procedure or TAU procedure).

In further another example, if transmission data (for example, MO data) to be transmitted in the light connection state is generated, the higher layer (for example, NAS) of the UE may trigger a new NAS procedure for transitioning from the light connection state into the RRC connected state.

When the AS procedure (one of the service request procedure, attach procedure, TAU procedure, and new NAS procedure) is initiated from the higher layer, since the RRC of the UE can recognize that the UE is in the light connection state, therefore the UE may perform transitioning from the light connection state into the RRC connected state. For example, the NAS procedure may be performed between the UE and a core network entity. For another example, the NAS procedure may not be performed between the UE and the core network entity, and only the transition into the RRC connected state may be performed. Thereafter, the RRC may respond to the NAS. For example, the UE may perform only transitioning into the RRC connected state and does not need to transmit corresponding NAS signaling information (e.g., the transition instruction into the light connection state) to the core network via the BS.

2) Methods of Defining Information for Indicating a Light Connection in an RRC Connection Reconfiguration Message and Informing the Defined Information When recognizing that a UE supports a light connection, a BS may define information for indicating the light connection in an RRC connection reconfiguration message and inform the defined information to the UE.

The UE having received the RRC connection reconfiguration message indicating the light connection may perform an operation for the light connection state.

The operation of the UE for the light connection state may denote performing one or more operations of the following operations.

Storing a UE context

Storing UE identification information of the light connection state

Performing some or all operations (e.g., one or more operations of cell re-selection, paging, radio resource release/suspension) of the RRC idle UE.

Meanwhile, the BS may include additional configuration information for instructing additional detailed operations in the light connection state to the UE.

In a case where the UE receives the RRC connection reconfiguration message indicating the light connection state and suspends radio resources according to instruction information, the UE cannot transmit an RRC connection reconfiguration complete message to the BS. For example, in a case where an SRB for transmitting the RRC message is suspended, RRC signaling is unable to be transmitted. Alternatively, in a case where a media access control (MAC) is reset or in a case where radio configuration information of a corresponding cell is suspended, an RRC connection reconfiguration confirmation message is unable to be transmitted to the BS.

2-1) Embodiments of not Transmitting a Reconfiguration Confirmation Message for an RRC Connection Reconfiguration Message Indicating the Light Connection For example, the UE having received an RRC connection reconfiguration message including the information indicating the light connection may not transmit an RRC connection reconfiguration confirmation message to the BS.

2-2) when Receiving an RRC Connection Reconfiguration Message Indicating the Light Connection, Embodiments of Transmitting a Reconfiguration Confirmation Message and Transitioning to the Light Connection For example, the UE having received an RRC connection reconfiguration message including the information indicating the light connection may transmit an RRC connection reconfiguration confirmation message as a response first, and then apply the light connection.

2-3) Embodiments of Transition to the Light Connection Through a New RRC Connection Configuration Message Distinguished from an RRC Connection Reconfiguration Message For example, information indicating the light connection may be received through a DL RRC message distinguished from the RRC connection reconfiguration message. The DL RRC message may be defined as a message that does not require a success message or a confirmation message. A UE may receive the DL message and enter the light connection state.

The UE does not need to transmit a confirmation message or a failure message for the DL RRC message to a BS.

2-4) Embodiments of Supporting Some Communication Functions when Receiving an RRC Connection Reconfiguration Message Indicating the Light Connection and then Applying the Indicated Operation For example, when a UE having received the RRC connection reconfiguration message including information indicating the light connection transitions into the light connection state, a function (e.g., L2 entity, MAC maintaining) for performing an operation for indicating the RRC connection reconfiguration confirmation message to a BS may be maintained for a predetermined time or until a predetermined criterion is satisfied.

2-5) when a UE Receives an RRC Connection Reconfiguration Message Indicating the Light Connection and then Applies the Indicated Operation, Embodiments of Transitioning to the Light Connection if a Timer Expires For example, the UE having received an RRC connection reconfiguration message including information for indicating the light connection may operate a timer for transitioning to the light connection. The UE initiates the timer when receiving the RRC connection reconfiguration message including the information indicating the light connection. If a timer expires, the UE transitions into the light connection state. The UE may transmit the RRC connection reconfiguration confirmation message to the BS until the timer expires.

As described above, the BS may transmit instruction information through an RRC message, and the UE may configure the light connection based on the instruction information.

Embodiments of UE Paging

As described above, a UE may receive a paging message and change its connection state. For example, a UE in the light connection state may perform state transition into the RRC connected state or the RRC idle state according to types of UE identifier of a paging message. Accordingly, a UE paging method for a UE in the light connection state is provide according to at least one embodiment.

Figure 4:
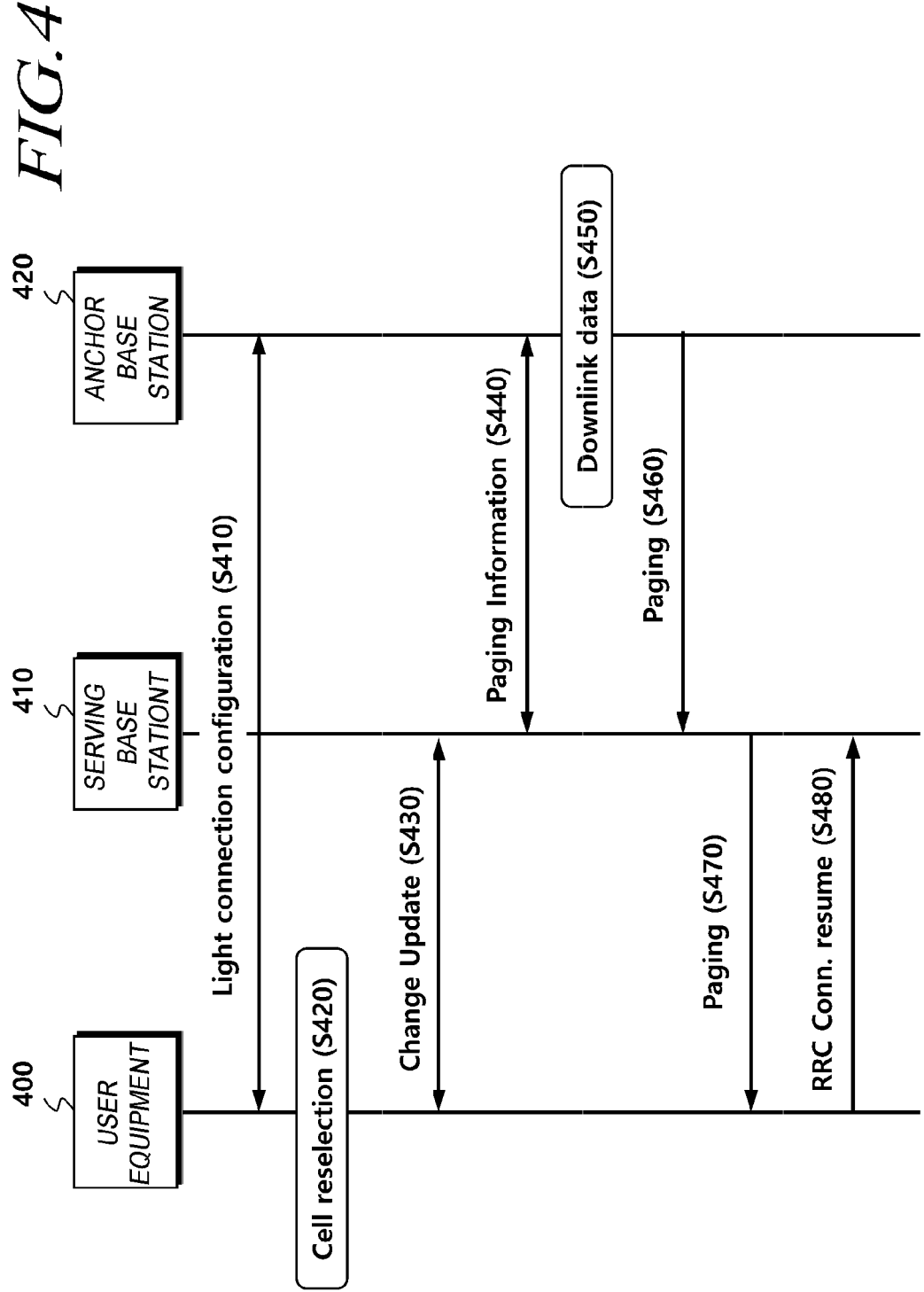
FIG. 4 is a signal flow diagram illustrating a procedure for processing a paging message according to some embodiments of the present disclosure.

FIG. 4 is a signal flow diagram illustrating a procedure for processing a paging message while a UE moves according to some embodiments of the present disclosure.

Referring to FIG. 4, the UE 400 and an anchor BS 420 may configure the light connection state at step S410. For example, as described above, the anchor BS 420 may instruct the UE 400 to perform state transition into the light connection state. In this case, the UE 400 configures the light connection state with the anchor BE 420. In this present disclosure, description is given such that a BS having indicated the connection state of a UE as the light connection state is referred to as an anchor BS or a BS (in a case where the movement of the UE is not presumed, it is generally described as a BS), and when the UE moves, a BS selected by a cell re-selection operation and making a connection with the UE after the UE moves is referred to as a serving BS.

The UE 400 in the light connection state may perform a cell re-selection operation as the UE moves at step S420. Since the UE 400 performs mobility operations by a cell re-selection other than a handover, it is necessary to update information on the cell re-selection. Accordingly, the UE 400 may perform an update process according to the cell re-selection with the serving BS 410.

The serving BS 410 shares information (e.g., paging information) acquired in the update process with the UE 400 with the anchor BS 420 at step S440. Accordingly, the anchor BE 420 may be able to identify which cell the UE 400 is located in and then process a paging message.

When the UE 400 is in the light connection state, maintained is a connection (e.g., a S1 connection) between a core network (CN) and a radio network (RAN). Accordingly, if DL data are received, the core network transfers the data to the anchor BS 420 at step S450.

If the DL data are received from the core network, the anchor BS 420 performs a paging procedure. For example, the anchor BS 420 transfers a paging message to a serving BE 410 in which the UE 400 is located according to cell re-selection at step S460, and the serving BS 410 transfers the paging message to the UE 400.

In a case where the UE 400 receives the paging message and changes its connection state into the RRC connected state, the UE 400 transmits an RRC connection resumption message to the serving BE 410 at step S480. As a result, the connection state of the UE 400 can be transitioned from the light connection state into the RRC connected state.

Thus, when a UE in the light connection state moves, if the UE does not cause a BS to update the location of the UE, the BS cannot recognize which cell the UE is located in.

Accordingly, when DL data are received in an anchor BS, before the anchor BS transmits data transferred to the anchor BS having indicated transition into the light connection state to the UE, it is needed that the anchor BS performs paging to the UE and then the UE transitions into the RRC connected state.

The BS may perform paging by using the following specific embodiments independently or in combination.

1) Embodiments of Requesting Paging Through a Core Network

In the light connection state, a core network is unable to recognize that a UE is in the light connection state. The core network recognizes that the UE is in the connection state based on the maintaining of a S1 connection. Accordingly, in a case where a core network entity has a signaling message to transmit to the UE, the core network entity transmits DL data to the anchor BS.

For example, if the anchor BS receives a DL NAS message (e.g., a DL NAS transport message) from a control plane core network entity (e.g., MME), the anchor BS may request paging to the MME.

The MME initiates a paging procedure and performs paging to the UE.

If the UE in the light connection state receives the paging, the UE performs an RRC connection resumption operation (e.g., transmitting the RRC connection resumption message) to transition from the light connection state into the RRC connected state.

If the BS (in the present disclosure, referred to as serving BS for convenience of description) that has performed an RRC connection resumption operation so that the UE transitioned from the light connection state into the RRC connected state is not an anchor BS, the serving BS may transition into the RRC connected state by looking up, fetching, interrogating, or receiving a UE context from an anchor BS. The serving BS may configure a connection with the anchor BS. If the connection between the anchor BS and the serving BS is established, the anchor BS transmits a DL NAS message to the serving BS. The serving BS transmits the DL NAS message to the UE.

The serving BS having performed the RRC connection resumption operation to transition from the light connection state into the RRC connected state by paging may transmit a confirmation message for paging success to the core network entity.

For another example, if receives DL data from a user plane core network entity (e.g., serving GW), the anchor BS may request paging to the MME.

The MME initiates a paging procedure and performs paging to the UE.

If the UE in the light connection state receives the paging, the UE performs an RRC connection resumption operation (e.g., transmitting an RRC connection resumption message) to transition from the light connection state into the RRC connected state.

If the serving BS that has performed an RRC connection resumption operation so that the UE transitions from the light connection state into the RRC connected state is not an anchor BS, the serving BS may transition into the RRC connected state by looking up, fetching, interrogating, or receiving a UE context from an anchor BS. The serving BS may configure a connection with the anchor BS. If the connection between the anchor BS and the serving BS is established, the anchor BS transmits DL data to the serving BS. The serving BS transmits the DL data to the UE.

The serving BS having performed the RRC connection resumption operation to transition from the light connection state into the RRC connected state by paging may transmit a confirmation message for paging success to the core network entity.

For another example, the anchor BS may directly perform paging to a corresponding cell of the BS or an area in which it is expected that the corresponding UE is located. If the anchor BS reaches a certain criterion (for example, the maximum number of paging failures is reached or a paging timer expires, etc.), it may request paging to a core network entity.

The anchor BS may release a stored UE context.

The anchor BS may consider the connection state of the UE as the RRC idle state.

2) Embodiments of Receiving Information for Paging from a Core Network

In the light connection state, a core network does not recognize that a UE is in the light connection state. In the light connection state, the core network may recognize that the UE is in the connection state based on the maintaining of an S1 connection. Accordingly, in a case where the core network entity has a signaling message to transmit to the UE, the core network entity transmits DL data to an anchor BS.

For example, if the anchor BS receives a DL NAS message (e.g., a DL NAS transport message) from a control plane core network entity (e.g., MME), the anchor BS may initiate paging to a cell associated with the anchor BS or a cell to which the anchor BS can initiate paging.

It is necessary to store information for paging in order to enable the anchor BS to directly initiate paging to a UE because the anchor BS does not receive a paging message from a control plane core network entity. That is, since paging is initiated in a RAN layer, it is necessary for storing information for RAN-initiated paging in the anchor BS. Hereinafter, the information for RAN-initiated paging is will be described as information for paging or configuration information for RAN-initiated paging.

Hereinafter, various embodiments for an anchor BS to obtain information for initiating paging will be described.

2-1) Methods of Looking Up Through a Core Network when an Anchor BS Instructs the Light Connection Mode to a UE For example, when an anchor BS transmits information instructing the light connection state to a UE and thereby the UE transitions into the light connection state, the anchor BS may request and receive information for paging generated by a core network entity. For example, the information received by the anchor BS through the core network entity may include at least one or more of UE identification information, source cn-domain of paging, UE specific DRX information, and cell area information including indication/configuration of the light connection.

Hereinafter, information received by requesting information for paging generated by a core network to the core network entity denotes information (9.1.6 paging information) for paging generated by a core network defined in 3GPP TS 36.413, which is an interface specification between an MME and a BS. For example, the information for paging generated by the core network may include at least one or more of UE identification information, source cn-domain of paging, UE specific DRX information, and cell area information including indication/configuration of the light connection. Here, the UE identification information denotes UE identification information (a UE identification information index) for calculating a paging frame and denotes IMSI mod 1024. Here, the UE specific DRX denotes DRX information that a UE has signaled to a core network entity (MME) or paging DRX information configured in the UE by a core network entity, during a core network procedure (e.g., a network registration procedure (attach procedure)). The UE specific DRX may be modified by a BE, and in this case, the BS may notify the MME of the UE specific DRX. For another example, it can be used by transparently modifying to the MME. Here, the source cn-domain of paging is information denoting that paging has occurred from a CS or PS domain. Here, the cell area information including indication/configuration of the light connection denotes cell area information (tracking area identity) for identifying a tracking area constituted by a core network entity.

2-2) Methods of Looking Up Through a Core Network when DL Data are Received from a Core Network Entity in the Light Connection State For example, when receiving DL data (e.g., a DL NAS transport message) through a connection (e.g., a connection between a control plane core network entity and a BS, for example, an S1-C connection) of a corresponding UE, for the UE in the light connection state, the anchor BS may request and receive information for paging through a control plane core network entity (e.g., MME). For example, information requested by the anchor BS and received through the core network entity may include at least one or more of UE identification information, source cn-domain of paging, UE specific DRX information, and cell area information including indication/configuration of the light connection.)

For another example, when receiving DL data (e.g., user plane data) through a connection (e.g., a connection between a user plane core network entity and a BS, for example, an S1-U connection) of a corresponding UE, for the UE in the light connection state, the anchor BS may request and receive information for paging through a control plane core network entity (e.g., MME). The information requested by the anchor BS and received through the core network entity may include at least one or more of UE identification information, source cn-domain of paging, UE specific DRX information, and cell area information including indication/configuration of the light connection.

Meanwhile, the BS may buffer the DL data until looking up, fetching, interrogating, or requesting and receiving paging information. When configuring the UE to transit into the light connection state, the BS may monitor data reception over an S1-connection associated with the corresponding UE.

2-3) Methods of Receiving Information for Paging, with Reference to a UE Supporting the Light Connection, when Transmitting an Initial Access Context to a BS As described above, a BS may be able to recognize whether a UE supports the light connection through UE capability information. When a UE context for a corresponding UE supporting the light connection is transmitted to the BS, information for paging may be included in it, and thereby the UE context including information for paging may be transmitted.

For example, a control plane core network entity may transmit an initial context setup request message including information for paging to the BS. The information for paging included in the initial context setup request message may include at least one or more of UE identification information, source cn-domain of paging, UE specific DRX information, and cell area information including indication/configuration of the light connection. As described above, the information for paging received by a core network denotes information (9.1.6 paging information) for paging generated by the core network defined in 3GPP TS 36.413, which is an interface specification between an MME and a BS. For example, the information for paging generated by the core network may include at least one or more of UE identification information, source cn-domain of paging, UE specific DRX information, and cell area information including indication/configuration of the light connection. Here, the UE identification information denotes UE identification information (a UE identification information index) for calculating a paging frame and denotes IMSI mod 1024. Here, the UE specific DRX denotes DRX information that a UE has signaled to a core network entity (MME) or paging DRX information configured in the UE by a core network entity, during a core network procedure (e.g., a network registration procedure (attach procedure)). The UE specific DRX may be modified by a BE, and in this case, the BS may notify the MME of the UE specific DRX. For another example, it can be used by transparently modifying to the MME. Here, the source cn-domain of paging is information denoting that paging has occurred from a CS or PS domain. Here, the cell area information including indication/configuration of the light connection denotes cell area information (tracking area identity) for identifying a tracking area constituted by a core network entity.

3) Embodiments Receiving Paging Information from a UE and Performing Paging 3-1) Methods for Including Paging Information into a Confirmation Message for an RRC Message Indicating the Light Connection For example, if a UE receives an RRC message indicating the light connection from a BS, the UE may transmit a response message including information for paging (e.g., paging information).

For example, the information for paging may include at least one or more of UE identification information, source cn-domain of paging, UE specific DRX information, and cell area information including indication/configuration of the light connection. To do this, a NAS layer of the UE may perform a step for receiving information for paging generated by a core network in advance.

3-2) Methods for Including Paging Information into a Confirmation Message for an RRC Message for Transitioning into the Light Connection For example, when requesting RRC connection resumption to transition from the light connection state into the RRC connected state, a UE in the light connection state may transmit the RRC connection resumption including information for paging to the BS. For example, the information for paging may include at least one or more of UE identification information, source cn-domain of paging, and UE specific DRX information.

For another example, a UE in the light connection state may request RRC connection resumption to transition from the light connection state into the RRC connected state and receive a confirmation or response message in response to the request. The UE may transmit an RRC message for transition into the light connection state, which includes information for paging, to the BS. The information for paging may include at least one or more of UE identification information, source cn-domain of paging, and UE specific DRX information.

For further another example, a UE in the light connection state requests RRC connection resumption to transition from the light connection state into the RRC connected state. Next, instruction information for the information request for paging may be received through a confirmation/response message for the RRC connection resumption request. In response to this, the UE may transmit an RRC message (or an RRC message for transitioning into the light connection state) including information for paging to the BS. The information for paging may include at least one or more of UE identification information, source cn-domain of paging, UE specific DRX information, and cell area information including indication/configuration of the light connection.

3-3) when Updating UE Information by Performing Cell Re-Selection in the Light Connection State, Methods of Transmitting the UE Information Including Paging Information A UE in the light connection state may perform cell re-selection as the UE moves.

For example, if a UE performs cell re-selection in the light connection state, the UE may transmit configuration information for RAN-initiated paging for the corresponding UE to an anchor BS. The BS may configure information for indicating such an operation in the UE. The configuration information for the RAN-initiated paging may include at least one or more of UE identification information, source cn-domain of paging, UE specific DRX information, and cell area information including indication/configuration of the light connection.

For another example, when a UE transitions into the light connection state, a BS may transmit the configuration information for RAN-initiated paging for the corresponding UE in the light connection state to an anchor BS. The configuration information for the RAN-initiated paging may include at least one or more of UE identification information, source cn-domain of paging, UE specific DRX information, and cell area information including indication/configuration of the light connection. The BS may configure additional information for indicating such an operation in the UE. For example, period/timer information for triggering update, information on the number of cell re-selections for triggering update, and cell area information for triggering update (triggering if a UE moves out corresponding cell area information) may be configured in the UE. The UE may transmit the information for paging to the anchor BS if the UE meets trigger conditions.

Embodiments of UE Operations According to Receiving of a Paging Message

Hereinafter, embodiments for operations of a UE will be described, in a case where a BS performs a paging procedure and then a paging message is received in the UE.

1) Methods of Performing the Transition from the Light Connection State into the RRC Connected State A BS may initiate paging and then a UE may receive a paging message, in order to transition from a light connection state into a connection state.

For example, if a UE is in the light connection state, in a case where a higher layer recognizes the light connection state for a paging record (or paging information) included in a paging message, when a UE identifier included in the paging record matches an identifier of the corresponding UE, the UE identifier may be indicated to the higher layer. For example, the UE may identify whether the UE identifier included in the paging message matches a UE identifier allocated by a higher layer of the UE.

If the UE identifier included in the paging record matches the UE identifier of the UE, and a paging cause is to instruct transition from the light connection state into a connection state (or to indicate the paging of a light state), the UE may indicate the UE identifier to the higher layer.

At this time, the UE may inform the UE identifier including a paging cause to the higher layer.

In a case where the higher layer receives a paging indication indicating transitioning from the light connection state into the RRC connected state as a paging cause, the higher layer may instruct a lower layer (e.g., an RRC layer) to perform the transition from the light connection state into the RRC connected state.

For another example, in a case where the higher layer is unable to recognize the light connection state, if a UE identifier included in a paging record matches a UE identifier of the corresponding UE, the UE may initiate the transition from the light connection state into the RRC connected state. For example, the UE may perform RRC connection resumption without notifying the higher layer of the transition from the light connection state into the RRC connected state. Since the RRC connection resumption is performed without an interaction with the higher layer, a UE identifier allocated by a BS may be used as a UE identifier included in a paging record.

For another example, if a UE identifier included in the paging record matches a UE identifier of the corresponding UE, and a paging cause is to indicate to transition from the light connection state into a connection state (or to indicate the paging of a light state), the UE may initiate transition from the light connection state into the RRC connected state.

Thus, the UE may determine to change its connection state using a UE identifier included in a paging message.

2) Methods of Processing when a UE Receives a Paging Message During Performing Connection Transition in the Light Connection State If a UE receives a paging message when the UE inin in light connection state requests an RRC connection resumption in order to transition from the light connection state into the RRC connected state, the UE (e.g., an RRC layer) may ignore or remove the paging message. That is, a paging message is not processed over an RRC layer.

A serving BS may perform continually an RRC connection resumption procedure for transitioning from the light connection state into the RRC connected state.

When an anchor BS has initiated a paging procedure and receives signaling for transitioning from the light connection state into the RRC connected state from a serving BS, the anchor BS may perform continually a signaling procedure for transitioning into the RRC connected state. The anchor BS may remove, release, abort, discard, or suspend the paging procedure.

3) Methods of a Serving BS for Performing Operations when the Serving BS Receives a Paging Message During Performing Connection Transition in the Light Connection State A serving BS receiving an RRC connection resumption request from a UE in the light connection state in order to transition from the light connection state into the RRC connected state may receive a paging message while transmitting it to an anchor BS.

For example, the serving BS may ignore, discard, remove, or release the paging message. Accordingly, paging is not transmitted to the UE for the paging message received over an RRC layer of the serving BS from the anchor BS.

The serving BS may transmit relevant cause information to the anchor BS.

A serving BS may perform continually an RRC connection resumption procedure for transitioning from the light connection state into the RRC connected state.

In a case where an anchor BS has initiated a paging procedure and receives signaling for transitioning from the light connection state into the RRC connected state from a serving BS, the anchor BS may perform continually a signaling procedure for transitioning into the RRC connected state. In this case, the anchor BS may remove, release, abort, discard, or suspend the paging procedure.

4) Methods of Performing State Transition According to Paging Failure

Since DL data for a UE in the light connection state is generated, a paging message may be transmitted to transition from the light connection state into the RRC connected state. At this time, paging may fail due to an arbitrary cause (e.g., power-off of the UE, out of coverage, etc.)

For example, if paging fails according to a predetermined criterion such as reaching a preset maximum paging failure count, expiration of the paging timer, or the like, the BS may indicate to release a connection state with a core network to the corresponding UE. To do this, the UE may transmit a UE context inactivation or release message to a control plane core network entity (e.g., an MME). The anchor BS may discard buffered user data.

5) Operation Methods in Case of Receiving Paging Using Core Network UE Identification Information (IMSI or S-TMSI)

Paging using an IMSI being one of core network UE identifiers may be an abnormal procedure used to recover an error in a network. If the S-IMSI being one of core network UE identifiers is not used due to network failure, the network may initiate paging for an EPS service using the IMSI. For example, paging may be initiated by a UE identifier including the IMSI.

An anchor BS may transmit the paging using the IMSI to a UE. For example, a paging message including the IMSI as a UE identifier may be transmitted to the UE.

If paging using the IMSI is received, the UE indicates this to a higher layer.

For example, the UE may receive a paging message to cause a UE in the light connection state to transition from the light connection state into the RRC connected state. The UE may indicate a paging message or relevant cause information to a higher layer.

The UE may transition into the RRC idle state.

That is, after the transition has been initiated by a core network for the UE in the light connection state, the UE having received a paging message including a UE identifier of a higher layer as a UE identifier may transition into the RRC IDLE state and indicate this to the higher layer. According to transitioning from the RRC connected state into the RRC idle state, released are all radio resources including MAC release from entities for all configured radio bearers. Further, according to indicating a UE identifier and relevant cause information to a higher layer, the higher layer may initiate a NAS procedure.

For another example, a paging message including the S-IMSI as a UE identifier may be transmitted to the UE.

If paging using the S-IMSI is received, the UE indicates this to a higher layer.

For example, the UE may receive a paging message to cause a UE in the light connection state to transition from the light connection state into the RRC connected state. The UE may indicate a paging message or relevant cause information to a higher layer.

The UE may transition into the RRC idle state.

That is, after the transition has been initiated by a core network for the UE in the light connection state, the UE having received a paging message including a UE identifier of a higher layer as a UE identifier may transition into the RRC IDLE state and report this to the higher layer. According to transitioning from the RRC connection state into the RRC idle state, released are all radio resources including MAC release from entities for all configured radio bearers. Further, according to indicating a UE identifier and relevant cause information to a higher layer, the higher layer may initiate a NAS procedure.

That is, when the UE in the light connection state has received a paging message, and when information included in the paging message has a core network UE identifier, such as the IMSI or S-TMSI, the UE may transition from the light connection state into the RRC idle state.

A higher layer may inactivate a locally-EPS bearer context and detach from the EPS. The UE may perform an attaching procedure after the UE is locally detached. For another example, the UE may perform a service request procedure.

Methods of Transitioning from the Light Connection State into the RRC Idle State A BS may instruct a UE to transition from the light connection state into the RRC idle state.

For example, the UE may transition into the RRC idle state by receiving an RRC connection release message. If the UE transitions from the light connection state into the RRC idle state, the UE releases all radio resources including release of an RLC entity, a MAC configuration and an associated PDCP entity for all configured radio bearers. In addition, the UE releases or removes a stored UE context provided by a BS.

For example, if a higher layer recognizes the light connection state, the UE may indicate release of the RRC connection including a relevant release cause.

For another example, if the light connection state is provided transparently to a higher layer (the higher layer does not recognize the light connection state), the UE does not indicate the release of the RRC connection to the higher layer.

UE Identification Information of the Light Connection State

Meanwhile, since a UE in the light connection state is not in the RRC connection state, a handover operation is not required. Accordingly, the UE in the light connection state may perform a cell re-selection operation as the UE moves.

To do this, even though a UE in the light connection state moves, it is necessary for a network to identify the UE. Thus, the BS may perform RAN-initiated paging to the corresponding UE. In addition, when the UE moves, in order to identity a UE context of the corresponding UE according to the RAN-initiated paging and process by looking up, fetching, or interrogating the identified UE context, a BS having configured the UE into the light connection state may need a UE identification information of the BS and/or a UE identification information of a cell, for identifying this.

To effectively perform state transition and data transmission for a corresponding UE, the following information may be used independently or in combination as UE identification information of the light connection state.

1) Storing a UE Identification Information of a Core Network as a UE Identification Information The UE identification information (S-TMSI) of the core network includes a core network entity code (MMEC) and an identification information (M-TMSI) tentatively allocated by the core network entity. Accordingly, a UE may be uniquely identified in the core network entity. In order to use UE identification information of a core network as UE identification information in RAN-initiated paging, an MME is required to transmit this to a BS before RAN-initiated paging.

2) Storing Cell Identification Information, Wireless Network Temporary Identification Information as a UE Identification Information If a cell in the network can be uniquely identified through cell identification information, a UE may be uniquely identified by combining the cell identification information with wireless network allocation identification information allocated to identify a UE context by a BS covering the corresponding cell.

A RAN-initiated paging may be performed, as UE identification information, using an identifier obtained by combining the cell identification information with the information allocated to identify the UE context by the corresponding BS.

3) Storing BE Identification Information, Wireless Network Temporary Identification Information as a UE Identification Information If a BS in the network can be uniquely identified through BS identification information, a UE may be uniquely identified by combining the BS identification information with wireless network allocation identification information allocated to identify a UE context by a corresponding BS. A RAN-initiated paging may be performed, as UE identification information, using an identifier obtained by combining the BS identification information with the information allocated to identify the UE context by the corresponding BS.

4) Storing CU Identification Information, Wireless Network Temporary Identification Information as a UE Identification Information If a CU in the network can be uniquely identified through CU identification information, a UE may be uniquely identified by combining the CU identification information with wireless network temporary identification information tentatively allocated by a corresponding CU.

A RAN-initiated paging may be performed, as UE identification information, using an identifier obtained by combining the CU identification information with the information allocated to identify the UE context by the corresponding BS.

Methods of Transmitting UL Data or Signaling of a UE in the Light Connection State A UE in the light connection state may transmit or receive data by transitioning into the light connection state. To do this, if the transition into the light connection state is trigged, a UE performs transition into the RRC connected state.

For example, in a case where there are UL data or signaling in a UE in the light connection state (MO data or MO signaling) or a UE in the light connection state receives a paging message, the UE may transition into the RRC connected state (or resume RRC connection or initiate transition into the RRC connected state, for convenience of description, hereinafter, transition from the light connection state into the RRC connected state or transition into the RRC connected state is used), in a corresponding cell.

Hereinafter, specific procedures for a UE to transition into the RRC connected state will be described according to some embodiments.

1) An Embodiment Using an RRC Connection Request Message

A UE may transmit an RRC connection request message to a BS through a common control channel (e.g., CCCH).

If a higher layer triggers transition from the light connection state into the RRC connected state and if the higher layer has provided the S-TMSI, a value received from the higher layer may be set as a UE identifier.

If transition from the light connection state into the RRC connected state is triggered in an access stratum (AS), a value received from a BS and stored may be set as a UE identifier. Description on this will be given later.

If a higher layer triggers transition from the light connection state into the RRC connected state, an establishment cause value corresponding to information received from the higher layer may be set. The establishment cause value may denote information on a trigger cause that causes transition into the RRC connected state. For example, a UE may add information indicating transition from the light connection state into the RRC connected state. For another example, a UE may add information indicating transition from the light connection state into the RRC connected state to an RRC connection setup complete message.

If transition from the light connection state into the RRC connected state is triggered in an AS, a value indicating transition from the light connection state into the RRC connected state may be set as an establishment cause value.

2) An Embodiment Using an RRC Connection Re-Establishment Request Message

A UE may transmit an RRC connection re-establishment request message to a BS through a common control channel (e.g., CCCH).

The UE sets C-RNTI used in a cell having instructed the light connection state as c-RNTI.

The UE sets a physical cell identifier in a cell having instructed the light connection state as a phyCell Id.

The UE sets MAC-I as calculated MAC-I 16 least significant bits.

The UE my set a reestablishment cause as a value instructing transition from the light connection state into the RRC connected state.

For another example, if transition from the light connection state into the RRC connected state is triggered in an AS, a value received from a BS and stored may be set as a UE identifier. Description on this will be given later.

3) An Embodiment Using an RRC Connection Resumption Request Message

A UE may transmit an RRC connection resumption request message to a BS through a common control channel (e.g., CCCH).

A value received from a BS and stored may be set as a UE identifier. Description on this will be given later.

If a higher layer triggers transition from the light connection state into the RRC connected state, an establishment cause value corresponding to information received from the higher layer may be set. The establishment cause value may include cause information causing to transition into the RRC connected state. For example, the establishment cause value may include information indicating any one of paging message reception, transmission data trigger, and transmission signaling trigger. For example, a UE may add information indicating transition from the light connection state into the RRC connected state. For another example, a UE may add information indicating transition from the light connection state into the RRC connected state to an RRC connection resumption complete message.

If transition from the light connection state into the RRC connected state is triggered in an AS, a value indicating transition from the light connection state into a connection state may be set as an establishment cause value.

The UE sets MAC-I as calculated MAC-I 16 least significant bits.

4) An Embodiment Utilizing a New RRC Connection Request Message Using a Common Channel A UE may transmit a new RRC connection request message to a BS through a common control channel (e.g., CCCH).

A value received from a BS and stored may be set as a UE identifier.

If a higher layer triggers transition from the light connection state into the RRC connected state, an establishment cause value corresponding to information received from the higher layer may be set. For example, a UE may add information indicating transition from the light connection state into the RRC connected state. For another example, a UE may add information indicating transition from the light connection state into the RRC connected state to an RRC connection resumption complete message.

If transition from the light connection state into the RRC connected state is triggered in an AS, a value indicating the transition of the light connection may be set as an establishment cause value.

The UE sets MAC-I as calculated MAC-I 16 least significant bits.

As described above, the effect of using more capacity on the network node with less processing effort is provided for a UE performing frequent connection state transition. In addition, there is an effect of providing a specific method of changing the connection state of the UE by processing a paging message in a case where the UE receives the paging message in the light connection state. Thus, the ambiguity of operations of a UE supporting the light connection state can be prevented.

Hereinafter, configurations of a UE and a BS capable of performing a part or all of the embodiments described with reference to FIG. 1 to FIG. 4 will be discussed with reference to the drawings.

Figure 5:
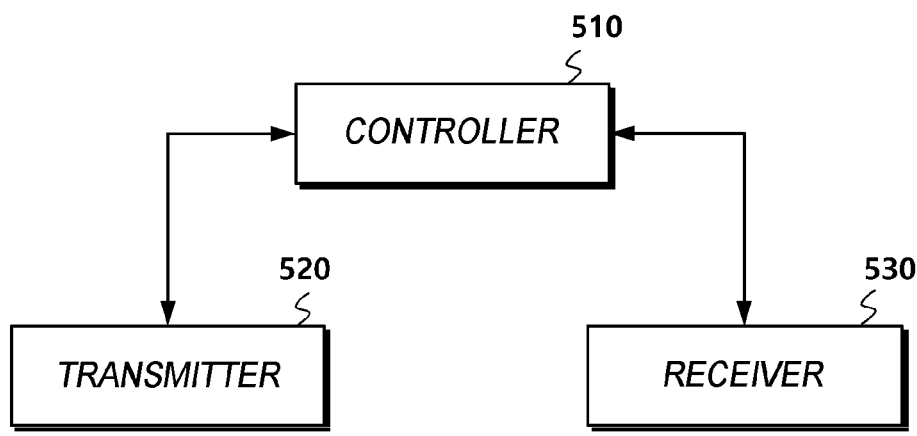
FIG. 5 is a diagram illustrating user equipment according to some embodiments of the present disclosure.

FIG. 5 is a diagram illustrating a UE according to some embodiments of the present disclosure.

Referring to FIG. 5, a UE 500 changing it's a connection state may include a receiver 530 configured to receive a radio resource control (RRC) message including instruction information for instructing state transition into the light connection state from a BS, and a controller 510 configured to transit a connection state of the UE into the light connection state based on the instruction information.

In addition, the receiver 530 may be further configured to receive a paging message for the UE, and the controller 510 may be configured to determine to change the connection state of the UE based on a UE identifier included in the paging message. In addition, the controller 510 may be configured to suspend all signaling radio bearer (SRB) and data radio bearer (DRB) of the UE and configure the light connection state by storing a UE context. If a UE identifier included in the paging message matches a first UE identifier allocated by a higher layer of the UE, the controller 510 may be configured to determine to change the connection state of the UE into the RRC idle state. If a UE identifier included in the paging message matches a second UE identifier allocated by a BS, the controller 510 may be configured to determine to change the connection state of the UE into the RRC connected state. For example, the first UE identifier may be the International Mobile Subscriber Identity (IMSI) or the SAE-Temporary Mobile Subscriber Identity (S-TMSI), and the second UE identifier may be information configured by information for identifying between BS identification information and a UE context allocated by the BS.

Meanwhile, the UE 500 may further include a transmitter 520. For example, the transmitter 520 may be configured to transmit UE capability information indicating whether to support the light connection to the BS. In addition, the transmitter 520 may be configured to transmit an RRC connection resumption message requesting transition of the connection state of the UE from the light connection state into the RRC connected state to the BS.

In addition, when the UE in the light connection state moves, the controller 510 may be configured to perform a cell re-selection operation other than a handover operation.

In addition, the receiver 530 is configured to receive DL control information and data, messages from the BS through a corresponding channel. In addition, the controller 510 is configured to control operations for state transition into the light connection state described above and overall operations of the UE 500 according to paging message processing. In addition, the transmitter 520 is configured to transmit UL control information and data, messages to the BS through a corresponding channel.

Figure 6:
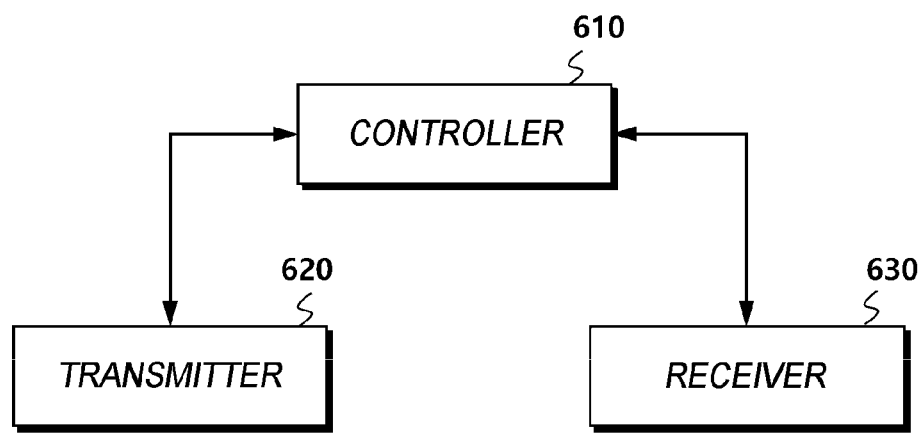
FIG. 6 is a diagram illustrating a base station according to some embodiments of the present disclosure.

FIG. 6 is a diagram illustrating a BS according to some embodiments of the present disclosure.

Referring to FIG. 6, a BS 600 may include a transmitter 620 configured to transmit a radio resource control (RRC) message including instruction information for instructing state transition into the light connection state to a UE, and a controller 610 configured to change the connection state of the UE into the light connection state.

The transmitter 620 is configured to transmit a paging message including a UE identifier to the UE and trigger the connection state of the UE to be changed, and the controller 610 is configured to suspend all signaling radio bearer (SRB) and data radio bearer (DRB) of the UE and change the connection state of the UE into the light connection state by storing a UE context.

Meanwhile, the UE identifier may be one of a first UE identifier allocated by a higher layer (e.g., non access stratum) of the UE and a second UE identifier allocated by a BS. For example, if the paging message includes the first UE identifier, the connection state of the UE may be transitioned into the RRC idle state, and if the paging message includes the second UE identifier, the connection state of the UE may be transitioned into the RRC connected state.

The BS 600 may further include a receiver 630 configured to receive a paging information for transmitting a paging message from a core network control plane entity. The receiver 630 is configured to receive the paging information through an initial context setup request message. The paging information may include one or more of paging DRX, UE identification information indexes and cell area information. The controller 610 may be configured to generate a paging message using the received paging message and transmit it to the UE.

In addition, the controller 610 is configured to control an operation for state transition into the light connection state, required to perform embodiments described above, and an overall operation of the BS 600 related to paging message processing.

In addition, the transmitter 620 and the receiver 630 respectively are configured to transmit and receive signals, messages, data required to perform embodiments described above to and from a UE.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of the present disclosure shall be construed on the basis of the accompanying claims in such a manner that all of the technical ideas included within the scope equivalent to the claims belong to the present disclosure.

The invention claimed is:

1. A method of changing a connection state of a user equipment, the method comprising:
   receiving a radio resource control (RRC) message from a base station, where the RRC message includes instruction information for instructing state transition into a light connection state;
   configuring a connection state of the user equipment into the light connection state based on the instruction information;
   receiving a paging message for the user equipment; and
   determining to change the connection state of the user equipment based on a UE identifier included in the paging message,
   wherein the configuring into the light connection state includes suspending signaling radio bearer (SRB) and data radio bearer (DRB) of the user equipment and storing a UE context for maintaining a core network connection between the base station and a core network for the user equipment.

2. The method according to claim 1, wherein when the UE identifier included in the paging message matches a first UE identifier allocated by a higher layer of the user equipment, the determining to change the connection state includes determining to change the connection state into an RRC idle state.

3. The method according to claim 2, wherein the first UE identifier is International Mobile Subscriber Identity (IMSI) or SAE-Temporary Mobile Subscriber Identity (S-TMSI).

4. The method according to claim 1, wherein when the UE identifier included in the paging message matches a second UE identifier allocated by the base station, the determining to change the connection state includes determining to change the connection state into an RRC connected state.

5. The method according to claim 4, wherein the second UE identifier includes BS identification information and information for identifying a UE context allocated by the base station.

6. A method of controlling by a base station a connection state of a user equipment, the method comprising:
   transmitting an radio resource control (RRC) message to the user equipment, wherein the RRC message includes instruction information for instructing state transition into a light connection state;
   changing a connection state of the user equipment into the light connection state; and
   transmitting a paging message including a UE identifier to the user equipment and triggering the connection state of the user equipment to be changed,
   wherein the changing into the light connection state includes suspending signaling radio bearer (SRB) and data radio bearer (DRB) of the user equipment, and storing a UE context for maintaining a core network connection between the base station and a core network for the user equipment.

7. The method according to claim 6, wherein the UE identifier is one of a first UE identifier allocated by a higher layer of the user equipment and a second UE identifier allocated by the base station.

8. The method according to claim 7, wherein when the paging message includes the first UE identifier, the connection state of the user equipment is transitioned into an RRC idle state, and when the paging message includes the second UE identifier, the connection state of the user equipment is transitioned into an RRC connected state.

9. The method according to claim 6, further comprising receiving a paging information for transmitting the paging message from a core network control plane entity after the transmitting of the RRC message.

10. The method according to claim 9, wherein the paging information is included in an initial context setup request message.

11. The method according to claim 9, wherein the paging information includes at least one of paging DRX, a UE identification information index, and cell area information.

12. A user equipment changing a connection state, the user equipment comprising:
- a receiver configured to receive an radio resource control (RRC) message from a base station, wherein the RRC message includes instruction information indicating state transition into a light connection state; and
- a controller configured to transit a connection state of the user equipment into the light connection state based on the instruction information,
- wherein the receiver is configured to receive a paging message for the user equipment, and
- wherein the controller is configured to determine to change the connection state of the user equipment based on a UE identifier included in the paging message, and
- wherein the controller is configured to suspend signaling radio bearer (SRB) and data radio bearer (DRB) of the user equipment, and store a UE context for maintaining a core network connection between the base station and a core network for the user equipment.

13. The user equipment according to claim 12, wherein when the UE identifier included in the paging message matches a first UE identifier allocated by a higher layer of the user equipment, the controller is configured to determine to change the connection state into an RRC idle state.

14. The user equipment according to claim 13, wherein the first UE identifier is one of International Mobile Subscriber Identity (IMSI) and SAE-Temporary Mobile Subscriber Identity (S-TMSI).

15. The user equipment according to claim 12,
- wherein when the UE identifier included in the paging message matches a second UE identifier allocated by the base station, the controller is configured to determine to change the connection state into an RRC connected state.

16. The user equipment according to claim 15, wherein the second UE includes B S identification information and information for identifying a UE context allocated by the base station.

* * * * *